United States Patent [19]

Howell et al.

[11] 3,894,177

[45] July 8, 1975

[54] SIGNAL DISTRIBUTION SYSTEM

[75] Inventors: Norman E. Howell; Russell G. Thompson; Eric R. Woods; all of San Diego, Calif.

[73] Assignee: General Dynamics, St. Louis, Mo.

[22] Filed: Mar. 23, 1973

[21] Appl. No.: 344,374

[52] U.S. Cl. ........................... 178/5.6; 178/DIG. 23

[51] Int. Cl.² ........................................... H04N 7/00

[58] Field of Search ............ 325/308; 178/DIG. 13, 178/DIG. 23, 5.6 R; 179/15 AQ, 179/15 A, 15 BS, 15 BP, 15 BM, 179/18 GF, 15 AL

[56] References Cited

UNITED STATES PATENTS

| | | | |
|---|---|---|---|
| 2,437,300 | 3/1948 | Labin | 178/DIG. 23 |
| 2,740,838 | 4/1956 | Pierce | 179/15 BD |
| 3,071,643 | 1/1963 | Matthews | 178/5.6 |
| 3,337,691 | 8/1967 | Litchman | 179/15 BM |
| 3,388,214 | 6/1968 | Eilers et al. | 178/5.6 |
| 3,659,053 | 4/1972 | Low et al. | 179/15 FD |
| 3,678,205 | 7/1972 | Cohen et al. | 179/15 AQ |
| 3,692,945 | 9/1972 | Maier | 179/18 GF |
| 3,701,851 | 10/1972 | Starrett | 179/15 BY |
| 3,707,604 | 12/1972 | Greefkes et al. | 179/15 A |
| 3,757,225 | 9/1973 | Ulicki | 178/DIG. 13 |
| 3,773,979 | 11/1973 | Kirk, Jr. et al. | 179/15 BM X |

OTHER PUBLICATIONS

Leeds and Weinberg, "Computer Programming Fundamentals Based on the IBM System 360", 1970, pages 558-561.

*Primary Examiner*—Robert L. Griffin
*Assistant Examiner*—Aristotelis M. Psitos
*Attorney, Agent, or Firm*—Martin LuKacher

[57] ABSTRACT

A system for distributing and routing a large number of audio-video signal channels is described. The system includes an input multiplexer and signal distribution networks, a matrix of switch groups and an output demultiplexer. In the input multiplexer the audio signals accompanying each video signal in each channel are digitized and the resulting digital signal angularly modulated to produce signals modulated by the digital signals and translated to a frequency region above the region of the video. A composite signal including the video and the angularly modulated audio signals are applied to the input distribution networks to drive a matrix of switch groups. Each output of the matrix switch has as many selectable inputs as there are input channels. Outputs are organized in groups to facilitate input distribution. Inputs are organized in blocks to facilitate input selection. An output demultiplexer is provided for each output and reconstructs the video and audio signals which are routed thereto by the matrix switch.

8 Claims, 9 Drawing Figures

| PARITY | AUX BIT | 12 | 11 | 10 | 9 | 8 | 7 | 6 | 5 | 4 | 3 | 2 | MSB 1 | ADD 1 | ADD 2 | REF. BIT |
|---|---|---|---|---|---|---|---|---|---|---|---|---|---|---|---|---|

TRANSMITTED WORD FORMAT

SIGNAL DISTRIBUTION SYSTEM

The present invention relates to signal distribution systems and particularly to systems for switching or routing to a multiplicity of outputs, signals from a multiplicity of input channels which can provide a plurality of analog signals, including broadband video and audio signals.

The invention is especially suitable for use in a television terminal for routing wideband signals including video and audio signals which may be generated in the course of operation of a television broadcast network. Features of the invention will, however, be generally applicable for controlling and routing analog, digital and video signals between source and load equipments.

The art of switching and distributing narrow band audio signals, although developed to a high degree of sophistication does not afford complete solution to the problem of distribution routing and switching of broadband signals, particularly network quality television video signals. With such signals, degradation or interference can not ordinarily be tolerated. Special switches have been developed for handling broadband signals (see for example U.S. Pat. Nos. 3,611,016 and 3,694,775). Nonetheless, there still have remained significant difficulties in distributing signals where each channel contains several discrete signal types, say both video and audio signals. Attempts at combining signals in a single channel which may be distributed or switched, have not been successfully performed within the constraints of controllability, complexity and coat. The consequences of such prior attempts at combining and ultimately switching various analog signal types have resulted in signal degradation or interference between signals. In addition, where it is desired to route to a multiplicity of outputs, any of the multiplicity of broadband input signals from different input channels, the result has again been signal degradation, interference and in some cases undesired blocking of one or more signal channels by another in the switch itself.

It is a principal object of this invention to provide an improved routing and switching system for handling multiple channels, each of which may contain a number of types of analog signals which may include a video as well as audio signals, and which is capable of handling said signals without interference or degradation, and which is relatively uncomplicated and may be manufactured at an effective cost.

It is a further object of the present invention to provide an improved broadband signal distribution system.

It is a still further object of the present invention to provide an improved system for switching television signals including both video and accompanying audio signals.

It is a still further object of the present invention to provide an improved system for routing or switching a multiplicity of input channels to a multiplicity of outputs wherein a plurality of different analog signal types, say both audio and video signal types, use the same switching assembly without adverse interaction.

It is a still further object of the present invention to provide an improved system for combining, as by multiplexing, a plurality of audio and video signals so that such signals can be switched with lower cross talk than if the audio signals were switched separately from the video signals.

It is a further object of the present invention to provide an improved system for transmitting and especially receiving a plurality of different analog signals, so that they share the same signal channels.

It is a still further object of the present invention to provide an improved system for multiplexing of analog and digital signals simultaneously.

It is a still further object of the present invention to provide an improved multiplexing system, especially for video and accompanying audio frequency signals.

It is a still further object of the present invention to provide an improved multiplexing system for multiplexing several different signal types on the same channels, thus making such channels, such as TV broadcast channels, available for the transmission of signals other than the audio which accompanies the video, and especially for digital signals which may accompany the video signals.

It is a still further object of the present invention to provide an improved multiplexing system for a plurality of different analog signals and digital signals which has the facility of demultiplexing of the digital signals at an output point, receiving point, or at the load equipment.

Briefly described, a signal distribution system embodying the present invention includes means for multiplexing a plurality of analog signals, say audio signals, so as to produce digital signals, say in a serial bit stream. Means are provided for angular modulating a carrier by these digital signals so as to translate the signals to a band in a signal channel which is frequency-wise displaced from other analog signals which may be transmitted by the channel, say video signals. The composite signals are provided in an individual channel, which may be one of the multiplicity of input channels. In order to distribute, switch, or route these channels, say with unlimited paralleling, to any of a multiplicity of selected outputs, a switching system is provided which includes a multiplicity of matrix switches having inputs for each of the input channels and an output for different ones of the outputs to which the channels may be switched. Distribution networks may be provided, such may include a plurality of successive resistive signal dividing networks, for applying each of the input channel signals to a different input of each of the matrix switches. The matrix switches thus distribute any of the input channels to the outputs. For each output there is provided means for demultiplexing the channel switched thereto. The demultiplexing means may include a first level of frequency selection which separates the digital signals from the analog, say video signals. The demultiplexing system also includes demodulating means for reconstructing the digital signals and for converting these signals back into analog form, if desired. The digital signals may of course be used directly as in computer, printer, or other digital signal utilization or transmission equipment.

The foregoing and other objects and advantages of the present invention will become more readily apparent from a reading of the following specification when taken in connection with the accompanying drawings in which.

Figure 1:
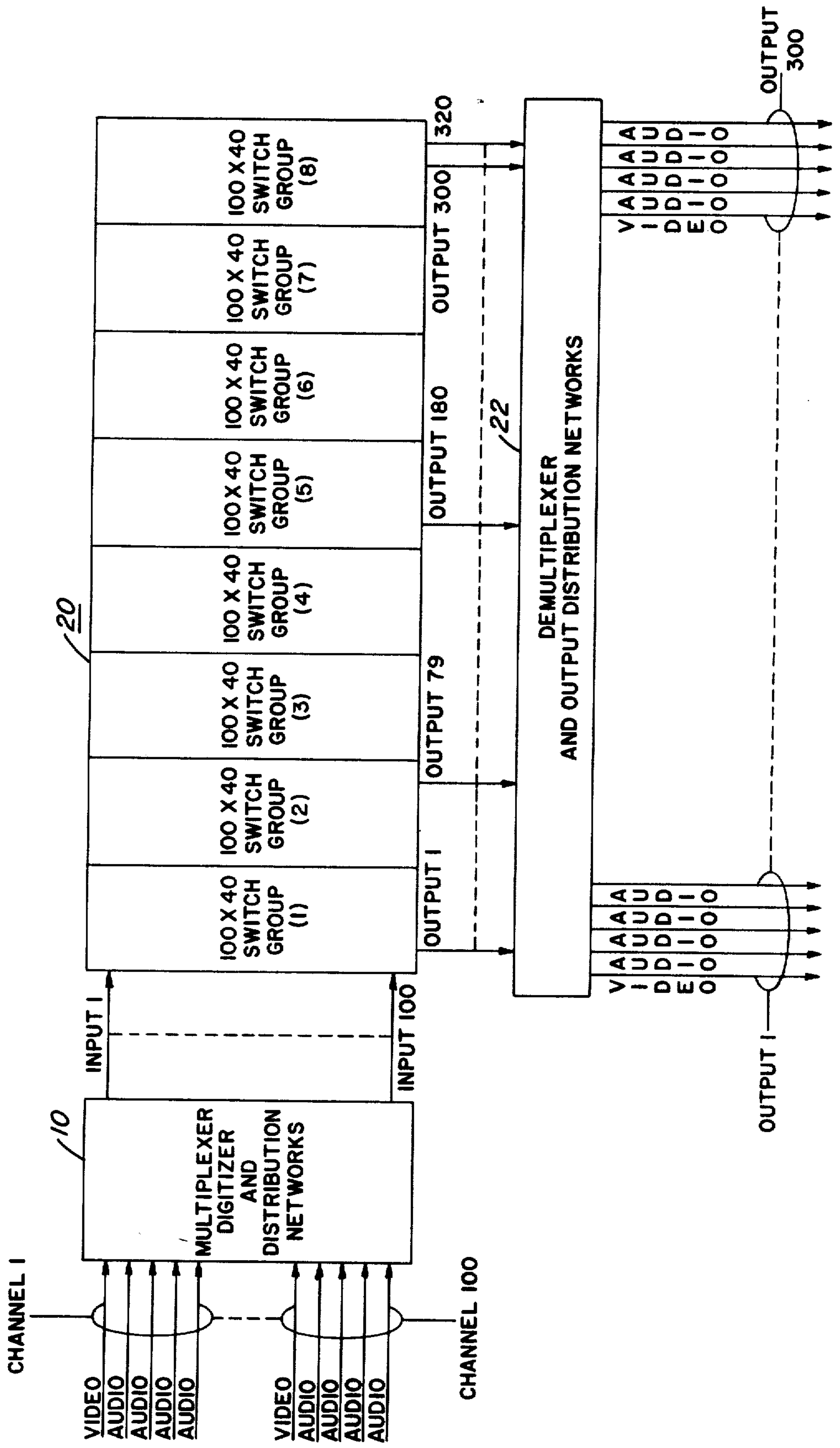
FIG. 1 is a block diagram of a system for multiplexing, switching and routing a multiplicity of different input channels each containing video and audio signals to a multiplicity of outputs.
Figure 2:
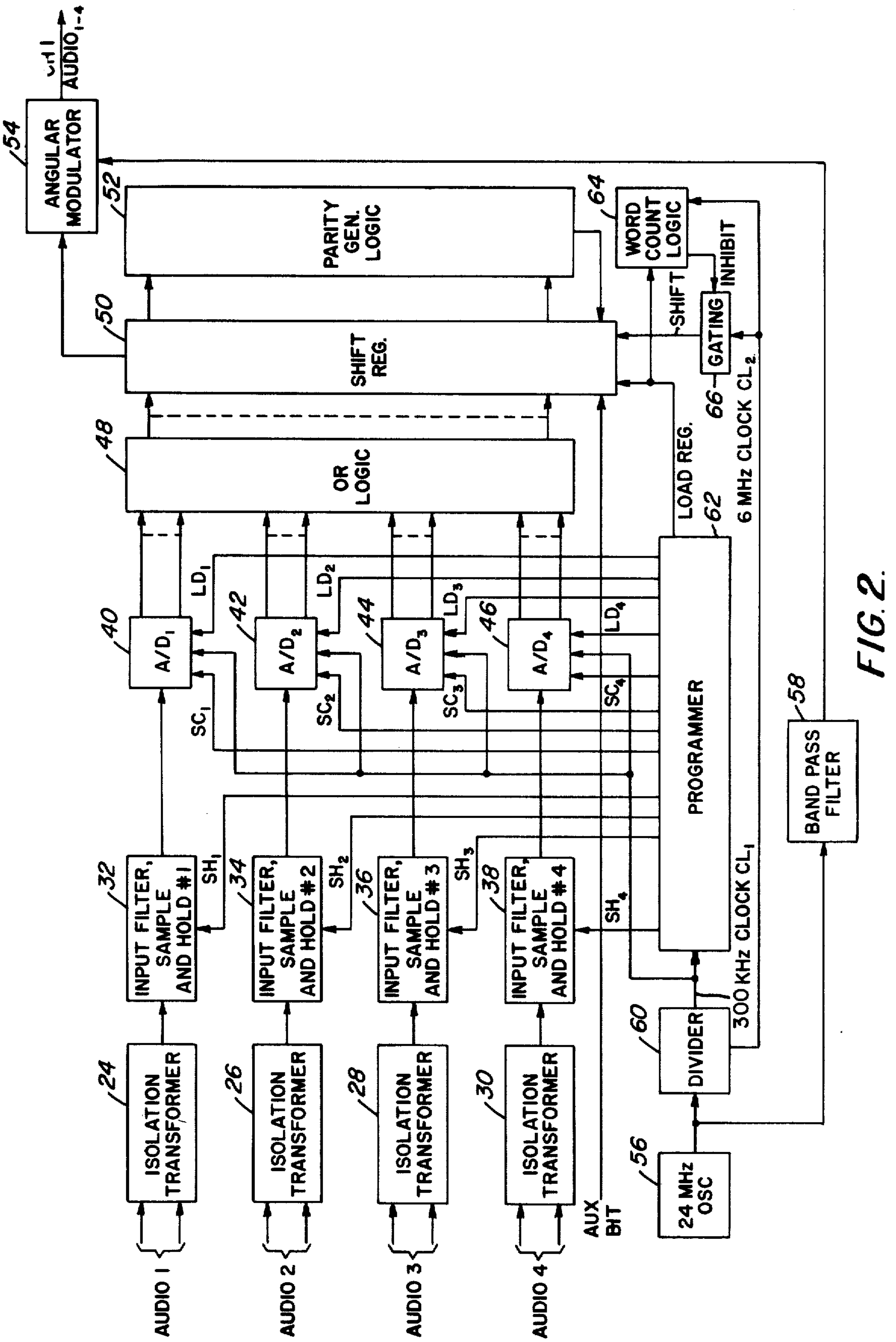
FIG. 2 is a block diagram of a typical channel multiplexer which may be used in the system shown in FIG. 1.
Figures 5, 9:
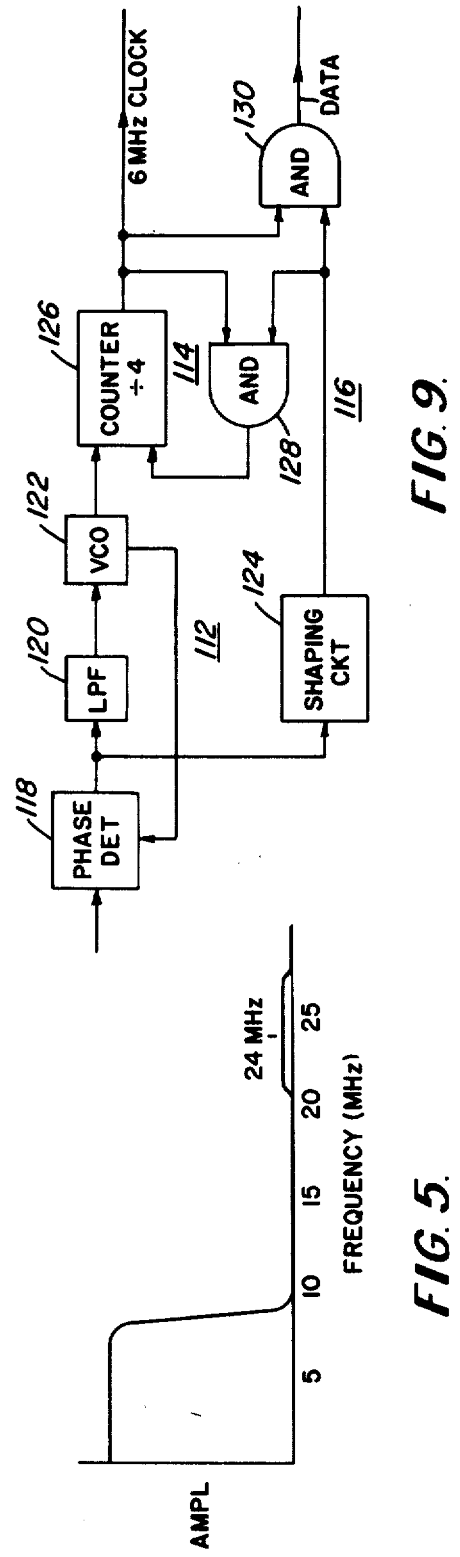
FIG. 5 is a graph showing the location in frequency of the video and digital signals which are multiplexed in the operation of the system shown in FIG. 2.
Figure 8:
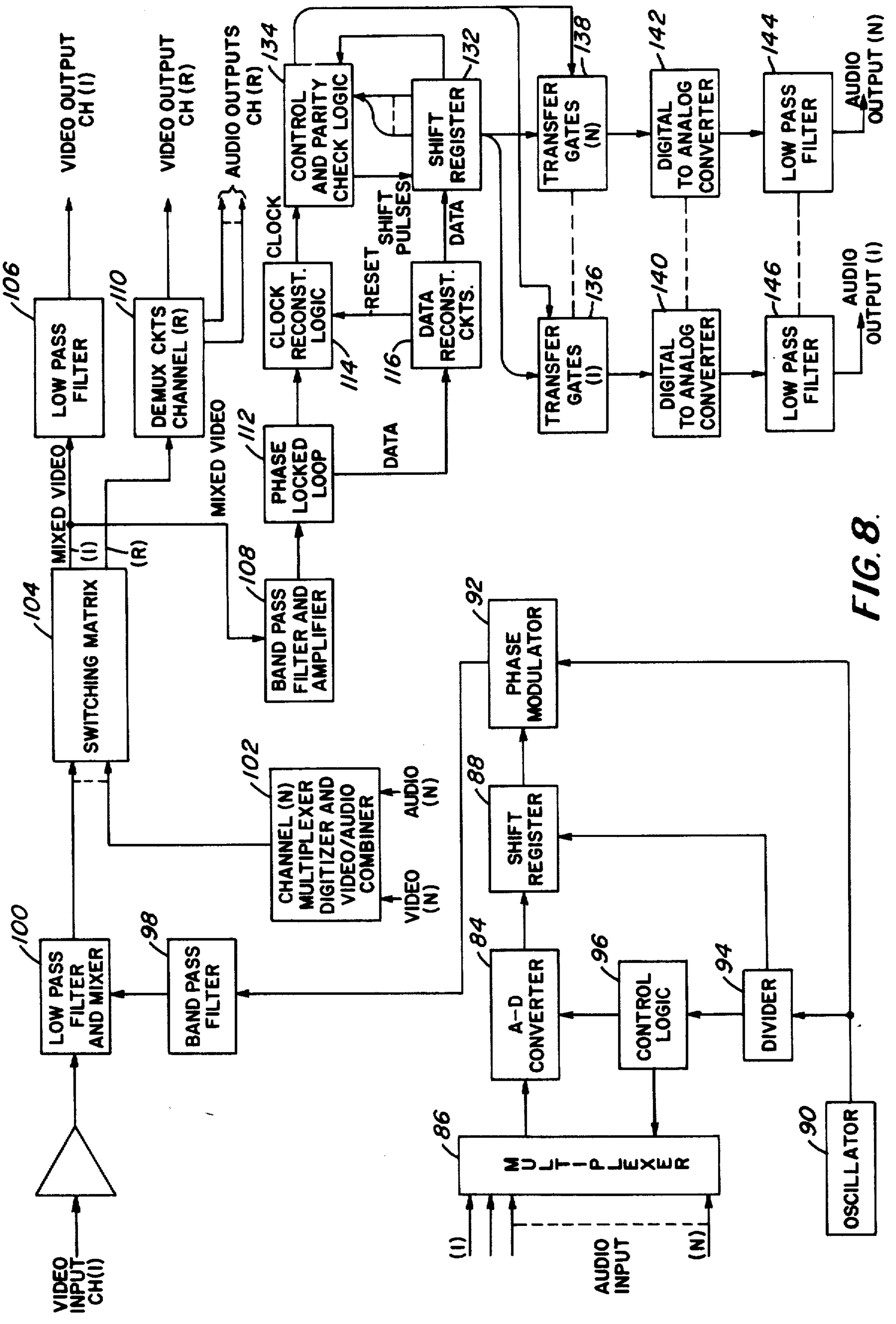

FIG. 8 is a block diagram showing a signal distribution switching and routing system similar to that shown in FIG. 1; the system using a different embodiment of multiplexer for the audio signals than is illustrated in FIG. 2; and also showing in greater detail than shown in FIG. 1, the demultiplexer and output signal distribution system which may also be used in the system shown in FIG. 1; and FIG. 9 is a more detailed block diagram of the phase lock loop and clock and data reconstruction circuits used in the system shown in FIG. 8.

Referring now more particularly to FIG. 1, there is shown for purposes of illustrating the invention a signal distribution system for routing 100 input channels to 300 outputs, where the channels consist of analog signals, 1 video and 4 audio. The illustrated routing system may be used as part of a television broadcast network terminal for distributing the 100 inputs to the 300 outputs with unlimited paralleling of outputs to any input. In other words each output line is independent and any of the input channels may be routed thereto. On an overall basis, the system as shown in FIG. 1, consists of multiplexer, digitizer and distribution networks 10 which serve to multiplex the audio signals on each channel, digitize them, thereby converting them into digital signals. The networks 10 also combine the digital signals with the video analog signals to provide a composite signal, and distribute the composite signals to the switch assembly 20.

The switch assembly contains eight 100 input - 40 output (100 × 40), matrix switch groups. The 100 inputs are distributed to each of the eight switch groups of the assembly 20. Each group provides 40 outputs except that in the eight switch group only 20 outputs are utilized. It will of course be possible to use the entire 40 outputs of the eight groups, if desired. Additional switch groups may be added if additional output lines are needed. The arrangement of switch groups provides a high degree of space utilization, say each group occupying approximately three relay racks, with room left in the racks for the multiplexer, digitizer and distribution networks 10, as well as for a demultiplexer and output distribution network 22. While efficient space utilization is a feature of the invention, the invention is of course not restricted to any physical arrangements of the assemblies and other components of the system in relay racks.

Another feature of the invention resides in the minimization of the functional unit. Each channel has a similar multiplexer, digitizer and distribution network 10 associated therewith. Each of the switch groups is identical and within each switch group there is repetition of identical units. Each output has a substantially identical demultiplexer and output distribution network associated therewith. Accordingly, the system is highly adaptable to production by mass production techniques.

The demultiplexer and output distribution networks 22 have two levels of demultiplexing. First, the video signal is separated from the digital signals which carry the audio, then the audio signals are demultiplexed and the four audio signals which accompany each video signal are provided. Alternatively, the audio signals may be provided in digital form. It will be appreciated of course that in lieu of an audio (analog) signal, a digital signal may be provided. This digital signal is reconstructed by the demultiplexer and output distribution networks 22 and provided along with the video and the other audio signals at the outputs of the system.

FIG. 2 illustrates a typical multiplexer and digitizer for the audio signals of a typical input channel. The four audio signals are coupled via separate isolation transformers 24, 26, 28 and 30 to the input filters of four separate sample and hold circuits 32, 34, 36 and 38. The audio signals are successively sampled in the circuits 32 to 38 and successively converted into binary coded multi-bit words at the outputs of four separate analog to digital converters 40, 42, 44 and 46. The words are transferred in parallel through OR gates in OR logic 48 to load a shift register 50. The words from the analog to digital converters 40 to 46 have two address bits which are hard wired therein, which identify each of the four audio signals in the composite digital signal. A parity generator 52 inserts a parity bit and an auxiliary bit may be inserted into the shift register together with a reference bit which is always a binary 1, and is used in the digital signal reconstruction logic upon demultiplexing.

Figures 3, 4:
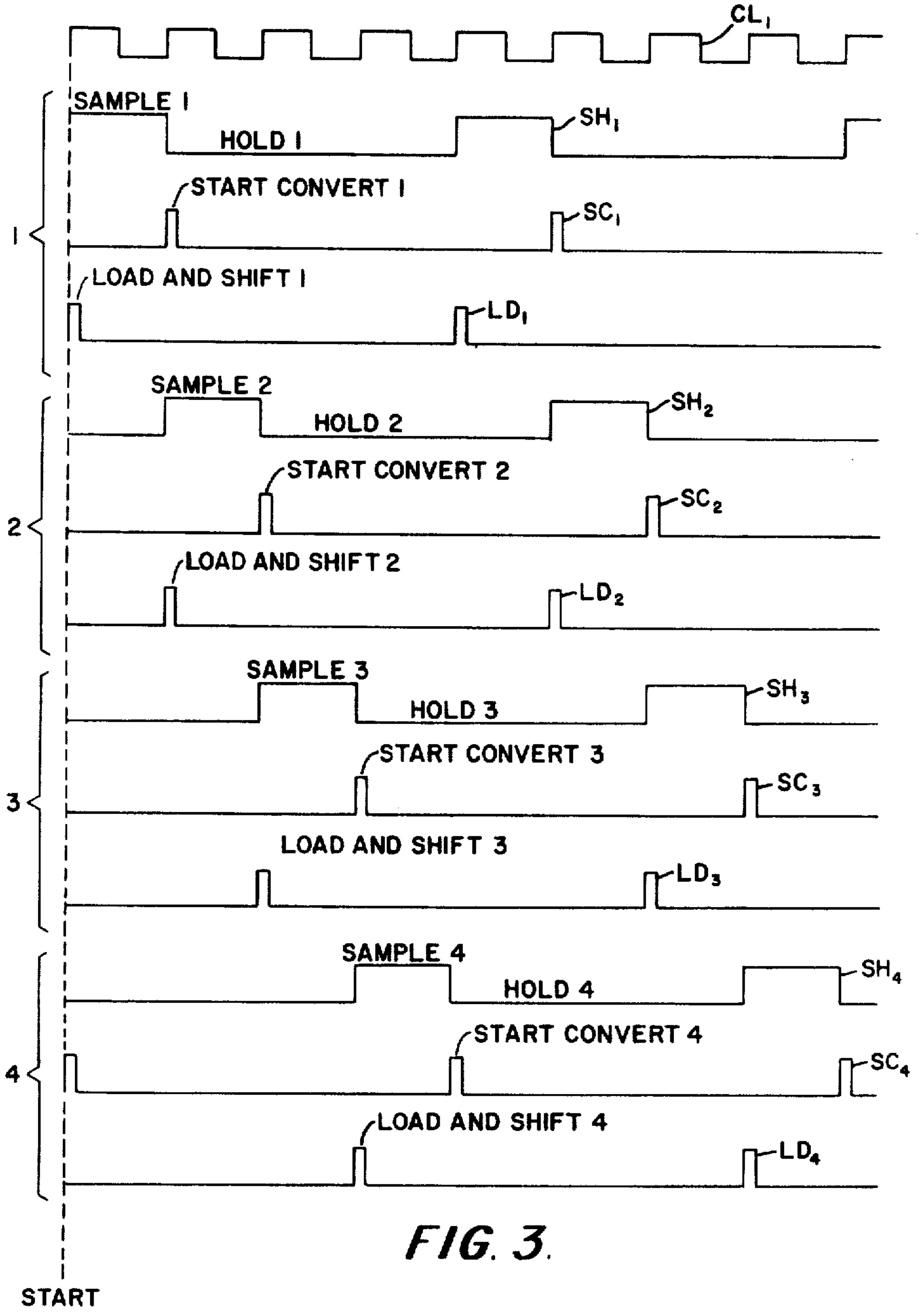
FIG. 3 is a timing/waveform diagram which illustrates the operation of the multiplexer shown in FIG. 2.
FIG. 4 is a diagram of the word format of the digital words generated and transmitted by the multiplexer shown in FIG. 2.

The locations of the various bits are illustrated in FIG. 4 which describe the word format for each word which is transferred to the OR logic 48 from each analog to digital converter. The shift register 50 is then read out by shift pulses from the clocking and timing logic of the system, to provide a serial binary bit stream which in this illustrative example is at a 75 kiloword rate. This serial bit stream is applied to an angular modulator 54 together with a carrier signal which is derived from a 24 MHz oscillator 56 (desirably crystal controlled) which is bandpass filtered in a filter 58 to insure that no extraneous components are included in the carrier. The angular modulated digital signal is amplitude controlled in the angular modulator 54 to provide a modulated signal having a bandwidth of ± 3 MHz about the 24 MHz carrier.

The composite digital signal which is transmitted is a function of the data in the shift register which is basically in NRZ (non return to zero) form, and of the 6 MHz clock which provides the shift pulses. Accordingly, the code, if the data were all 1 would be 180° out of phase with the code if the data were all 0. The composite signal therefore includes the code for the all 1 when the data is 1, and the code for the all 0 is when the data is 0. This composite signal angle modulates the 24 MHz carrier to produce a 6 MHz band centered about 24 MHz. The video signal is contained in the band below 10 MHz. Accordingly, there is sufficient signal separation between the digital signal band and the video signal band to permit both signals to be combined and carried by the same channel without interference, cross-talk, or other forms of degradation of either the video or audio signals. The switching assembly 20

Figure 7:
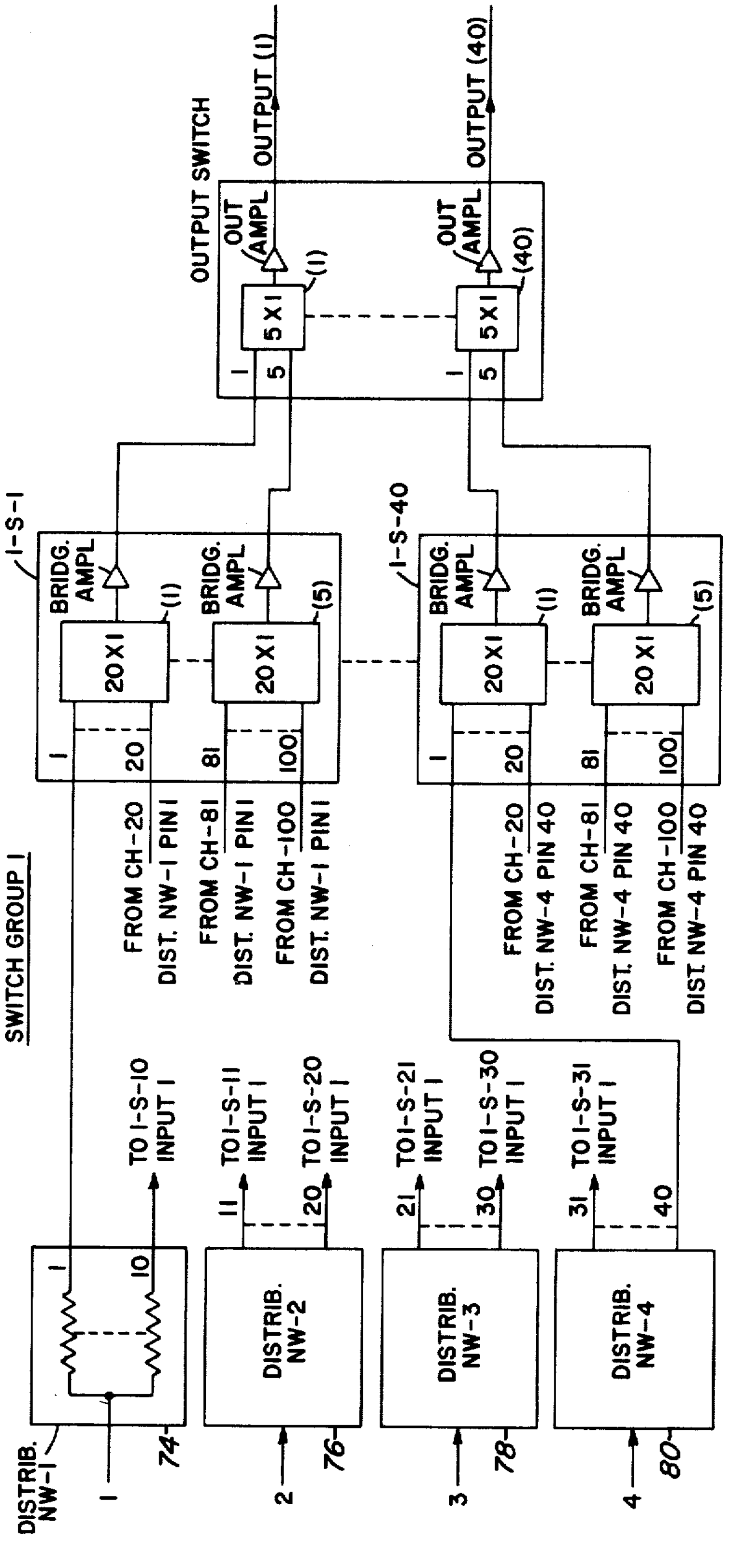
FIG. 7 is a simplified block diagram of one of the major switch groups used in the system shown in FIG. 1.

(FIG. 1) is capable of handling broadband signals, including 30 MHz components. Accordingly, the entire channel including the video and digitized analog signals will be switched and routed without interference in the course of operation of the distribution system. The frequency characteristic shown in FIG. 5, is for the composite video/digitized audio signal which is mixed and combined in the distribution amplifiers and summing networks for the channel which are shown in FIG. 7.

Returning to FIG. 2, the timing logic which controls the sequence of operation of the multiplexer and digitizer is referenced to and coherent with the 24 MHz oscillator output. This output is applied to a divider 60 which produces a 300 KHz clock ($CL_1$) and the 6 MHz clock ($CL_2$). The $CL_1$ clock controls a programmer 62 which provides the timing pulses illustrated in FIG. 3. The sample and hold pulses $S_{H1}$, $S_{H2}$, $S_{H3}$, and $S_{H4}$, are applied in sequence to the sample and hold circuits 32, 34, 36 and 38.

Consider the first audio signal sample and hold circuits 32. After the sample time and at the beginning of the hold period, a start convert pulse $S_{C1}$ is applied to the analog to digital converter 40. The converter 40 may be a successive approximation analog to digital converter which converts the level held by the sample and hold circuit 32 into a 12 bit digital word in binary form which is available at the output of the analog to digital converter 40. The load and shift pulse $L_{D1}$ is then applied to the converter and loads the word via the OR logic into the shift register 50. The programmer also provides "load register" pulses so that the shift register accepts the word together with the auxiliary and reference bit inputs, the address bits, and the parity generator logic operation is enabled to insert the parity bits. The parity, auxiliary and reference bits and the 12 data bit and address constitute the transmitted word format.

The load register pulse then provides an enable pulse to the word count logic 64 which counts to 17 before inhibiting gating logic 66. With the gating logic 66 enabled, the clock pulses $C_{L2}$ are applied to shift the bits out of the register. when 17 bits which constitute the complete transmitted word format (see FIG. 4) are transmitted, the gating logic 66 is inhibited. Accordingly, a transmitted word starting with a reference bit and ending with a parity bit will have been transmitted during each word count (17 bits).

In the event that there is no audio signal (viz., the sample level is zero) the transmitted word will constitute all 0 but the initial bit will be the reference bit which will be a 1.

The video signal is then passed through a low pass filter 67 (see FIG. 6) and the digitized audio, which is angularly modulated, is applied to a band pass filter 68. The filtered signals are then applied to a distribution amplifier 70 at the input of which is a resistive summing network.

Figure 6:
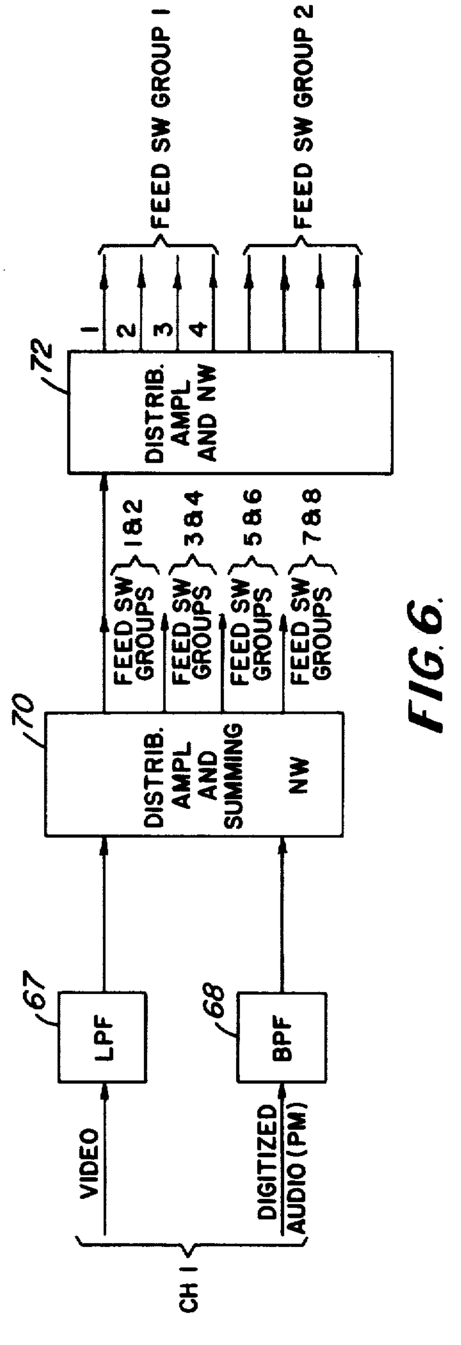
FIG. 6 is a block diagram showing the distribution and combining networks associated with a typical channel in the system shown in FIG. 1.

The distribution amplifier and summing network 70 as well as the low pass and bandpass filters 67 and 68 are illustrated in FIG. 6. The distribution amplifier 70 includes a network which may consist of four equal value resistors connected to a common junction located at the output of the amplifier. The network divides the channel one signals into four signals on four lines. The first of these lines feeds switch groups 1 and 2. The second feeds switch groups 3 and 4. The third feeds switch groups 5 and 6, and the fourth feeds groups 7 and 8. The switch groups are illustrated as part of the switch assembly 20 in FIG. 1. The line which feeds switch groups 1 and 2, as is typical for the other lines, is connected to a separate distribution amplifier and network 72. The signals are amplified and divided by means of resistive dividers which may consist of eight equal value resistors connected to a common input junction point, onto eight output lines. The first group of four of these lines from the output of the distribution amplifier network 72 feeds switch group 1. The second group of output lines feeds switch group 2.

Switch group 1 is typical and is shown in FIG. 7 by way of example. Each of the four output lines from the distribution amplifier and network 72 is applied to the input of the separate distribution network 74, 76, 78 and 80. Each network contains 10 equal value resistors. There are therefore 40 outputs from the distribution networks 74, 76, 78 and 80, for the first channel. It will be remembered that each of the other 100 input channels have four networks similar to the networks 74, 76, 78 and 80, and provide 40 outputs. The outputs from the first channel distribution networks 74, 76, 78 and 80, and from all of the other channel distribution networks similar thereto are applied to the switch group 1.

Switch group 1 consists of 40 input switch assemblies I-S-1 through I-S-40 and an output select switch. The input switch I-S-1 is typical and contains five 20-input to one (20 × 1) output matrix switches. These switches have twenty inputs and effectively one output. The single output is provided via a bridging amplifier, the input of which is connected in series with the switches. The switches themselves may be broadband crosspoint switches of the type described in the above referenced patents. Suitable crosspoints are magnetically operated reed switches which are assembled as discussed in the above referenced patents on short output buss segments equipped with the bridging amplifiers so that the lead lengths are controlled and any capacitive loadings within the switch are minimized. The switches therefore are able to handle a broad band of signals extending somewhat above the 30 MHz band of the channel signals (see FIG. 5). The output switch contains 40 (5 × 1) 5 input, 1 output-matrix switches of the same general type as the 20 × 1 switches. These switches may be similar crosspoint switches which are series connected to the input of an output bridging amplifier which provides the single output of the 5 × 1 switch. The five outputs of the bridging amplifiers of the first input switch I-S-1, are connected to the five inputs of the first 5 × 1 switch of the output switch. The second through fortieth input switches I-S-1 through I-S-40 are similarly connected to the inputs of the remaining 5 × 1 output switches. Accordingly, each input switch group (for example I-S-1) and its associated output switch (switch 1 of the output switch) constitutes a 100 × 1 matrix switch element. There are 40 such 100 × 1 elements in switch group 1.

An output from the distribution networks 74, 76, 78, and 80 is connected to each of the input switches I-S-1 through I-S-40. The input switches I-S-1 to I-S-40 also receive inputs from each of the distribution networks of the other 100 input channels. The connections between the distribution networks and the input switches I-S-1 to I-S-40 are depicted in FIG. 7. Accordingly, any of the 100 input channel signals may appear on any of the 40 outputs of switch group 1. There is unlimited paralleling of the input channel signals at the outputs. In other words, input channel 1 can appear on all 40 outputs and in fact on all 320 outputs of the switch assembly 20 (FIG. 1). In addition, the switching is accomplished without blocking. The connection of input channel 1 to output 1 for example, does not block the connection of any other input channel to any other channel of the 40 channels in the output switch of switch group 1.

Control of the switches (viz., the individual crosspoints) may be accomplished by operating (viz., passing operating current through) the coils of the selective crosspoint switches in the output switch 10 in the input switches I-S-1 to I-S-40. A separate power supply or current source may be provided for each switch group through appropriate logic (such as TTL/DTL) and the appropriate coils of the individual crosspoints. Such switching logic for controlling crosspoint switches in associated switch groups may be designed in accordance with techniques well known in the art and is therefore not described in detail herein.

Referring to FIG. 8, there is shown the overall signal distribution system. The system illustrates in detail the first channel inputs and outputs inasmuch as the other of the N channels are similar. The first channel signals include a video input and *n* audio inputs. The multiplexer and digitizer for the *n* audio channels is provided in accordance with another embodiment of the invention which affords the means for using a single analog to digital converter 84 rather than a multiplicity of such converters, one for each audio input as shown in FIG. 2. To that end, a multiplexer 86 is provided, each of the n audio inputs is applied to the multiplexer. The multiplexer samples and holds each input until it is converted into a digital word by the analog to digital converter 84. The converted word is transferred to a shift register 88 which provides the serial bit stream for modulating a carrier signal from an oscillator 90 in a phase modulator 92. The oscillator 90 also provides clock signals which are divided in a divider 94 and applied so as to step the multiplexer 86. The clock signals are also applied to the control logic which also receives inputs from the multiplexer so as to control the converting cycle of the analog to digital converter 84. The digital signal is bandpass filtered in a filter 98.

The composite signal both video and digitized audio is combined in a mixer 100 which may be constituted by a summing circuit to which the video input is applied after being low-pass filtered. The composite signal from channel 1 as well as from the other of the N channel multiplexer, digitizer and video/audio combiner circuits 102, is applied to a switching matrix 104 which may be similar to the switching matrix illustrated in FIG. 7. The distribution amplifiers and networks as shown in FIGS. 6 and 7, are also associated with the switching matrix 104.

The multiplicity of output channels, each containing mixed video/digitized audio signals is obtained from the outputs of the switching matrix. There are R such outputs. The first output is typical and contains the mixed video and digitized audio signals. The video signals are separated by means of a low pass filter 106. The digitized audio is separated by means of a bandpass filter and amplifier 108. The low pass filter 106, the bandpass filter and amplifier 108, and the circuits associated therewith, constitute the demultiplexing circuits (demux circuits) for the first channel. Similar demux circuits 110 are provided for all of the other R channels.

The demux circuits include circuits for demodulating the digitized signal so as to extract both the clock signal which may be the 6 MHz signal, and the data or digitized audio signals therefrom. To this end a phase lock loop 112 is provided. Outputs from the loop are the clock and the data. The clock signals are at 24 MHz and are applied to clock reconstruction logic 114. The data is applied to data reconstruction circuits 116.

The phase lock loop 112 and the data and clock reconstruction circuits 114 and 116 are as shown in FIG. 9. The phase lock loop consist of a phase detector 118, a low pass filter 120, and a voltage control oscillator 122. The nominal output frequency of the oscillator 122 is 24 MHz. The oscillator output is compared with the angular modulated signal extracted by the bandpass filter and amplifier 108 in the phase detector 114. The operation of the loop effectively strips the data and synchronizes the voltage controlled oscillator 122 to the digitized signal. Accordingly, the data signal is obtained at the output of the phase detector and may be provided in the form of a NRZ bit stream by shaping circuit 124 which may include limiting amplifiers and Schmitt triggers of the type known in the art. The data to be correct must be in synchronism with the clock; the clock being the 6 MHz clock. Accordingly the voltage control oscillator output is divided by four in a dividing counter 126, which is reset by an AND gate 128 when the clock is in synchronism with the data. The data is thereupon synchronized with the clock from the output of the counter 126 in another AND gate 130.

The data is applied to a shift register 132 (FIG. 8) and the clock is applied to control and parity check logic 134. It will be recalled that the first bit of each transmitted format word is a binary 1. When a binary 1 is detected in the last stage of the register by the control logic 134, the application of shift pulses to the shift register from the control logic 134 is inhibited. The format word is then stored in the shift register. This word is applied to the parity check logic to determine if parity is correct. If parity does not check, the shift register is reset and shift pulses are again applied to the shift register so as to shift in the next data word. If parity does check, the address bits are decoded and one of n transfer gates 136 to 138 is enabled by the control in parity check logic 134, depending upon which audio input corresponds to the data in the shift register. The output of the enabled transferred gate is applied to digital to analog converters 140 to 142; one such converter being provided for each audio input. The converters 140 to 142 convert the digital signal into analog form. Low pass filters 144 to 146 are connected to the outputs of each of the converters so as to smooth the analog signal. The outputs of the filters 144 to 146 are the initial audio inputs. Since these inputs are handled in digital form throughout switching, signal to noise ratio is preserved and interference is minimized. The digital signals may be of course used directly without reconversion into analog form, if desired. By means of multiplexing and digitizing the signals other than the video, more than one audio channel can be utilized in a television channel. This provides additional flexibility and frequency space and may be used to transmit digital signals for operating teleprinters or other digital devices so that even a home television receiver may be provided with additional facilities. For example, a printed newspaper may be produced from the digital output in a television channel, if the digital signal is handled by multiplexing and digitizing in accordance with this invention.

From the foregoing description it will be apparent that there has been provided an improved signal distribution system. Features of the invention are also applicable to multiplexing, demultiplexing, and otherwise for signal handling purposes where a plurality of analog signals or combined analog and digital signals are to be handled.

Illustrative embodiments of the systems incorporating the invention have been described herein for purposes of illustrating the invention. Variations and modifications in the herein described systems, within the scope of the invention, will undoubtedly suggest themselves to those skilled in the art. Accordingly, the foregoing description should be taken merely as illustrative and not in any limiting sense.

What is claimed is:

1. For use in a television terminal or the like having switching means for distributing a plurality of input channels to a plurality of outputs, said input channels each including a plurality of analog signals, one of which is a video signal which occupies a certain frequency baseband and another of which is another analog signal, multiplexing apparatus for each of said channels which comprise:

a. means for converting at least said other analog signal into digital signals, b. means responsive to said digital signals for providing a modulated signal corresponding thereto in a frequency band displaced above the band of said video signal, c. means for additively combining said video signal and said modulated signal to provide a multiplexed signal with the video signal accompanying said modulated signal, said video signal occupying its baseband and the modulated signal corresponding to said other analog signal a band above said baseband, and d. means for applying said multiplexed signal from said combining means separately in its respective input channel to said switching means.

2. The invention as set forth in claim 1 further comprising for each said outputs a demultiplexing system which comprises a. frequency responsive means for separating said modulated signal from its said accompanying video signal, b. means for reconstructing said digital signals from said separated modulated signal, and c. means for converting said reconstructed digital signals into analog form.

3. The invention as set forth in claim 1 wherein said analog signals include a plurality of audio signals, and said converting means including means for translating said audio signals into a serial train of pulses which provides said digital signal.

4. The invention as set forth in claim 1 wherein said modulated signal providing means includes a phase modulator, means for applying to said phase modulator a carrier signal having a frequency higher that the highest frequency of said video signal baseband, and means for also applying said digital signals to said phase modulator.

5. The invention as set forth in claim 1 wherein said plurality of analog signals includes said video and an audio signal, an analog to digital converter means responsive to said audio signal for providing a serial stream of pulses representing said audio signal in digital form, a source of carrier signals having a frequency higher than the highest significant baseband component of said video signal, a phase modulator to which said source is coupled, said pulses being applied to said modulator to modulate said carrier, and means applying the output of said modulator and said video signal to said additively combining means.

6. The invention as set forth in claim 5 wherein said analog signals include a plurality of audio signals, a plurality of said analog to digital converter means each for a separate one of said audio signals, a register, programming means for successively loading the said analog to digital converters to said register, and means for reading out of said register to provide said serial stream of pulses.

7. The invention as set forth in claim 6 including means responsive to said carrier signals for providing clock pulses of different repetition rate, including clock pulses of higher rate and of lower rate, means for applying said clock pulses of higher rate to said register to read out said register and means for applying said clock pulses of lower rate to said programming means.

8. The invention as set forth in claim 1 including demultiplexing means for said signals which comprise frequency selective means for separating said video signal from said modulated digital signals, a phase locked loop responsive to said modulated signal for demodulating said signal into said digital signal and for constructing said clock signals, a register, means operated by said clock signal for transferring said digital signal serially into said register, a plurality of digital to analog converters, and control means also responsive to said clock signals and to the contents of said register for successively transferring the contents of said register to different ones of said digital to analog converters, and means responsive to the outputs of said digital to analog converters for providing each of said plurality of audio signals.

* * * * *